(12) United States Patent
Walker et al.

(10) Patent No.: US 8,849,806 B2
(45) Date of Patent: Sep. 30, 2014

(54) METHOD, SYSTEM AND APPARATUS FOR EFFICIENTLY DETERMINING PRIORITY OF DATA IN A DATABASE

(75) Inventors: David Ryan Walker, Waterloo (CA); Gerhard Dietrich Klassen, Waterloo (CA); James Andrew Godfrey, Waterloo (CA); Scott Douglas Rose, Waterloo (CA); Matthew Bells, Waterloo (CA); Steven Henry Fyke, Waterloo (CA)

(73) Assignee: Blackberry Limited, Waterloo (CA)

( * ) Notice: Subject to any disclaimer, the term of this patent is extended or adjusted under 35 U.S.C. 154(b) by 350 days.

(21) Appl. No.: 12/729,868

(22) Filed: Mar. 23, 2010

(65) Prior Publication Data

US 2011/0238671 A1  Sep. 29, 2011

(51) Int. Cl.
*G06F 17/30* (2006.01)
*G06F 3/00* (2006.01)
*G06Q 10/00* (2012.01)
*G06Q 10/10* (2012.01)

(52) U.S. Cl.
CPC .............. *G06Q 10/109* (2013.01); *G06F 17/30* (2013.01); *G06F 3/00* (2013.01); *Y10S 715/963* (2013.01); *Y10S 715/968* (2013.01)
USPC ........... 707/723; 707/694; 707/748; 707/769; 707/805; 715/710; 715/752; 715/963; 715/968; 705/7.16; 705/7.18; 705/7.19; 705/7.24

(58) Field of Classification Search
USPC ................. 707/601–602, 656, 705–707, 723, 707/748–754, 792, 609, 694, 731, 769–770, 707/805; 709/203, 206, 737, 751–752, 762, 709/963; 705/309, 319, 301, 7.16, 705/7.18–7.19, 7.24; 706/926, 934; 345/650, 661, 674, 213; 715/710, 752, 715/963, 968; 719/318; 718/100
See application file for complete search history.

(56) References Cited

U.S. PATENT DOCUMENTS 6,480,830 B1 * 11/2002 Ford et al. .................... 705/7.19
6,708,202 B1 * 3/2004 Shuman et al. ............... 709/206

(Continued)

FOREIGN PATENT DOCUMENTS

WO  WO 2010/141216  * 12/2010

OTHER PUBLICATIONS

The technical aspects identified in the present application (Art. 92 EPC) are considered part of common general knowledge. Due to their notoriety no documentary evidence is found to be required. For further details see the accompanying Opinion and the reference below. XP002498048 XP002456252.

(Continued)

*Primary Examiner* — Srirama Channavajjala
(74) *Attorney, Agent, or Firm* — Perry + Currier Inc.

(57) ABSTRACT

A method and apparatus for determining priority of data in a database managed by a computing device are provided. The data comprises a list of events, the computing device comprising a processing unit interconnected with a memory device and a display device. Context data is processing at the processing unit to determine a priority ranking for each of the items, wherein processing the context data to determine a priority ranking comprises at least one of processing attendance data, location, event data, and telephone record data. Respective areas of the display device are controlled to provide visual representations of each of the events, each respective area controlled according to the priority ranking.

22 Claims, 18 Drawing Sheets

(56) References Cited

U.S. PATENT DOCUMENTS

| | | | |
|---|---|---|---|
| 7,693,825 B2* | 4/2010 | Wang et al. | 707/723 |
| 2002/0191035 A1* | 12/2002 | Selent | 345/866 |
| 2003/0225732 A1* | 12/2003 | Chan et al. | 707/1 |
| 2004/0073615 A1* | 4/2004 | Darling | 709/206 |
| 2006/0149609 A1* | 7/2006 | Stenerson et al. | 705/8 |
| 2006/0265263 A1 | 11/2006 | Burns | |
| 2007/0005406 A1* | 1/2007 | Assadian et al. | 705/8 |
| 2007/0198281 A1* | 8/2007 | Abernethy et al. | 705/1 |
| 2008/0065758 A1* | 3/2008 | Narayanaswami | 709/224 |
| 2008/0109718 A1* | 5/2008 | Narayanaswami | 715/262 |
| 2008/0201647 A1* | 8/2008 | Lagerstedt et al. | 715/748 |
| 2008/0228548 A1* | 9/2008 | McBrearty et al. | 705/9 |
| 2009/0018887 A1* | 1/2009 | Bank et al. | 705/8 |
| 2009/0174680 A1* | 7/2009 | Anzures et al. | 345/173 |
| 2010/0223088 A1 | 9/2010 | Martin et al. | |

OTHER PUBLICATIONS

EPO: "Mitteilung des Europlischen 1-15 Patentamts vom 1. Oktober 2007 Ober Geschiftsmethoden = Notice from the European Patent Office dated Oct. 1, 2007 concerning business methods = Communique de l'Office europeen des brevets,en date du ler octobre 2007, concernant les methodes dans le domaine des act i vites" Journal Officiel De L'Office Europeen Des Brevets.Official Journal of the European Patent Office dated Oct. 1, 2007.

European Patent Application No. 1015 7440.8 Search Report dated Jul. 7, 2010.

http://www.toodledo.com/info/details.php#customization.

Nadine Richard, et al. "Cascaded Generic XCS to Learn About Reminding Preferences", downloaded from http://www.psychologie.uni-wuerzburg.de/i3pages/butz/IWLCS2007/WS2007Papers/richard-iwlcs07.pdf.

Brett Adams, et al., "Sensing and Using Social Context", ACM Trans. Multimedia Comput. Comm. Appl. 5, 2, Article 11 (Nov. 2008), 27 pages, DOI = 10.1145/1413862.1413864 http://doi.acm.org/10.1145/1413862.1413864.

Elizabeth Mynatt, et al., "Inferring Calendar Event Attendance", IUI'01, Jan. 14-17, 2001, Santa Fe, new Mexico, U.S.A, Copyright 2001 ACM 1-58113-325-1/01/0001, downloaded from http://portal.acm.org/citation.cfm?id=360310.

http://www.reqall.com/about.

http://www.squareloop.com/Our_Technology.

http://www.ludimate.com/products/geominder/.

Anind K. Dey, et al., "CybreMinder: a Context-Aware System for Supporting Reminders", Future Computing Environments Group. College of Computing and GVU Center, Georgia Institute of Technology, Atlanta, GA, USA 30332-0280.

U.S. Appl. No. 11/829,872, filed Jul. 27, 2007—Method and System for Resource Sharing; Applicant: Mike Rao.

* cited by examiner

| Event Reminders for Monday February 1, 2010 | |
|---|---|
| TIME | Event |
| 09.00 | Breakfast Meeting |
| 11.00 | Weekly Department Meeting |
| 12.00 | Monthly Sales Meeting |
| 16.00 | Weekly Squash Game |

| Monday February 1, 2010 | |
|---|---|
| TIME | Event |
| 09.00 | |
| 10.00 | Breakfast Meeting 2 |
| 11.00 | |
| 12.00 | Weekly Department Meeting 3 |
| 13.00 | *Monthly Sales Meeting* 1 |
| 14.00 | |
| 15.00 | |
| 16.00 | Weekly Squash Game 4 |
| 17.00 | |

| TIME | Event Reminders for Monday February 1, 2010 — Event |
|---|---|
| 09.00 | |
| 10.00 | g 2 — Delete Weekly Squash Game? Has not been attended in 2 months. [Yes] 801 [No] |
| 11.00 | |
| 12.00 | Monthly Sales Meeting 1 |
| 13.00 | ly Department Meeting 3 |
| 14.00 | |
| 15.00 | |
| 16.00 | Weekly Squash Game 4 |
| 17.00 | |

| TIME | Event |
|---|---|
| 09.00 | |
| 10.00 | Breakfast Meeting 2 |
| 11.00 | |
| 12.00 | *Monthly Sales Meeting 1* |
| 13.00 | Weekly Department Meeting 3 |
| 14.00 | |
| 15.00 | |
| 16.00 | |
| 17.00 | |

Event Reminders for Monday February 1, 2010

| Synchronization Event Reminders for Monday February 1, 2010 | |
|---|---|
| TIME | Event |
| 08.00 | Synch My Songs Folder |
| 10.00 | Synch Tasks Folder |
| 13.00 | Synch E-mail Folder |
| 19.00 | Synch My Videos FOlder |

| Event Reminders for Monday February 1, 2010 | |
|---|---|
| TIME | Event |
| 09.00 | Breakfast Meeting |
| 12.00 | Monthly Sales Meeting |

| Monday February 1, 2010 | | |
|---|---|---|
| Show Work Events | TIME | Event |
| | 09.00 | |
| | 10.00 | |
| | 11.00 | |
| | 12.00 | |
| | 13.00 | |
| | 14.00 | |
| | 15.00 | |
| | 16.00 | Weekly Squash Game |
| | 17.00 | |

TABLE 1

| Monday February 1, 2010 | |
|---|---|
| Time | Events |
| 09.00 | Breakfast Meeting (Data 102a) |
| 10.00 | |
| 11.00 | |
| 12.00 | Monthly Sales Meeting (Data 102c) |
| 13.00 | Weekly Department Meeting (Data 102b) |
| 14.00 | |
| 15.00 | |
| 16.00 | Weekly Squash Game (Data 102n) |
| 17.00 | |

Fig. 18

METHOD, SYSTEM AND APPARATUS FOR EFFICIENTLY DETERMINING PRIORITY OF DATA IN A DATABASE

FIELD

The specification relates generally to database management and specifically to a method, system and apparatus for efficiently determining priority of data in a database.

BACKGROUND

Computing devices are used to determine priority of data in databases, however standard methods of determining priority of data in databases can have certain inefficiencies related to extraneous data and ordering of data. Hence, the technologies used to prioritize data in a database are currently limited.

BRIEF DESCRIPTIONS OF THE DRAWINGS

Implementations are described with reference to the following figures, in which:

FIG. 5 depicts a representation of a list of event reminders with higher priority events given visual precedence and lower priority events having reduced power consumed in their display, according to non-limiting implementations;

FIG. 6 depicts a representation of a calendar view with calendar events given visual precedence based on a priority ranking, according to non-limiting implementations;

FIG. 8 depicts the calendar view of FIG. 6 with a prompt for deleting data based on a priority ranking, according to non-limiting implementations;

FIG. 10 depicts the calendar view of FIG. 6 after a delete data event, according to non-limiting implementations;

FIG. 12 depicts a representation of a list of synchronization event reminders with higher priority events given visual precedence and lower priority events having reduced power consumed in their display, according to non-limiting implementations;

FIG. 15 depicts a representation of a list of event reminders with higher priority events given visual precedence and lower priority events having reduced power consumed in their display by their absence, according to non-limiting implementations;

FIGS. 16 and 17 depict representations of a calendar view with vacation related calendar events given visual precedence over work related calendar events based on a priority ranking, according to non-limiting implementations; and, FIG. 18 depicts a table comprising calendar events, according to non-limiting implementations.

DETAILED DESCRIPTION OF THE IMPLEMENTATIONS

Figure 1:
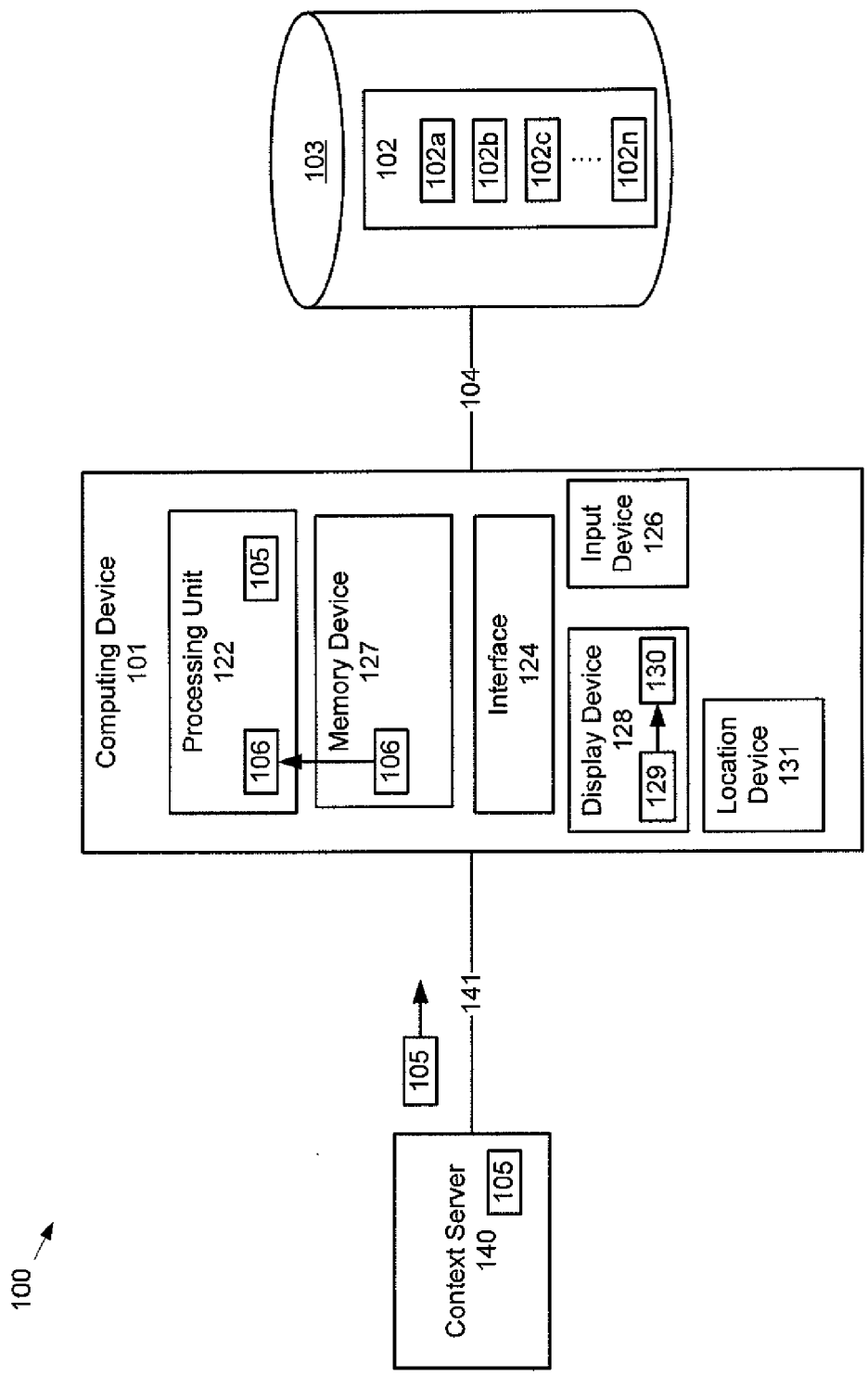
FIG. 1 depicts a block diagram of a system including a computing device for determining priority of data in a database, according to non-limiting implementations.

A first aspect of the specification provides a method for determining priority of data in a database managed by a computing device, the data comprising a list of events, the computing device comprising a processing unit interconnected with a memory device and a display device. The method comprises processing context data at the processing unit to determine a priority ranking for each of the events in the list. Processing the context data to determine a priority ranking can comprises at least one of: processing the data to determine attendance data associated with each of the event; processing location data associated with each of the events to determine the attendance data; processing the attendance data associated with each of the events to determine if recurring events have been attended, and assigning higher respective priority rankings to events having higher attendance; processing the attendance data to determine which of at least two conflicting recurring events have been previously attended, and assigning higher respective priority rankings to an event having higher attendance; processing event data to determine when each of the events have occurred, been cancelled or moved; and processing telephone record data to determine the attendance data. The method further comprises controlling respective areas of the display device to provide visual representations of each of the events, each respective area controlled according to the priority ranking.

Each respective area can be controlled according to different modes according to the priority ranking, at least one of the modes having a power lower than that of at least one other of the modes. A first one of the modes can correspond to a lower priority event relative to other events in the data, a first one of the modes consuming lower power than others of the modes.

The priority ranking can be further represented according to at least one of different icons, different fonts, different line widths, different colours, different transparencies and an absence of events below a threshold priority level.

The method can further comprise generating reminder data based on the priority ranking and controlling the display device to provide the reminder data based on the priority ranking. Generating reminder data can include an option for at least one of declining a calendar event invitation and moving an event associated with the data.

The method can further comprise controlling the display device to provide a calendar view of the data, wherein each of the events comprises a calendar event given a visual precedence in the calendar view based on the priority ranking. Each respective area can be controlled according to different modes according to the priority ranking, at least one of the modes having a power lower than that of at least one other of the modes and the visual precedence can correspond to a higher power mode or a lower power mode.

The method can further comprise generating delete data events based on the priority ranking to cause an event that meets a predetermined threshold value to be deleted from the data. The predetermined threshold value can be based on at least one of a period of time that a recurring calendar event has not been attended, a number of times that the recurring calendar event has been attended, and a threshold priority ranking. The method can further comprise generating a prompt indicative that the delete data events should be generated wherein the generating the delete data events occurs after receiving a positive response to the prompt.

The database can be stored in at least one of the memory device and a remote database.

At least one of the events can correspond to a work associated calendar event that occurs during a vacation period, the work associated calendar event automatically hidden during the vacation period. The method can further comprise providing a show work appointments icon at the display device which, when selected, causes the work associated calendar event to be displayed, and providing a hide work appointments icon which, when selected, causes the work associated calendar events to be hidden.

At least one of the events can correspond to a travel-related calendar event that occurs during a travel period, the travel-related calendar event given a visual precedence during the travel period. At least another of the events can correspond to a non-travel-related calendar event that occurs during the travel period, the non-travel-related calendar event given diminished visual precedence during the travel period.

A second aspect of the specification provides a computing device for determining the priority of data in a database managed by the computing device, the data comprising a list of events. The computing device comprises a processing unit interconnected with a memory device and a display device. The processing unit is enabled to process context data to determine a priority ranking for each of the events in the list. To process the context data to determine a priority ranking, the processing unit be further enabled to at least one of: process the data to determine attendance data associated with each of the events; process location data associated with each of the events to determine the attendance data; process the attendance data associated with each of the events to determine if recurring events have been attended, and assign higher respective priority rankings to events having higher attendance; process the attendance data to determine which of at least two conflicting recurring events have been previously attended, and assign higher respective priority rankings to an event having higher attendance; process event data to determine when each of the events have occurred, been cancelled or moved; and process telephone record data to determine the attendance data. The processing unit is further enabled to control respective areas of the display device to provide visual representations of each of the events, each respective area controlled according to the priority ranking.

The processing unit can be further enabled to control each respective area according to different modes according to the priority ranking, at least one of the modes having a power lower than that of at least one other of the modes. A first one of the modes can correspond to a lower priority event relative to other events in the data, a first one of the modes consuming lower power than others of the modes.

The priority ranking is further represented at the display device according to at least one of different icons, different fonts, different line widths, different colours, different transparencies and an absence of events below a threshold priority level.

The processing unit can be further enabled to generate reminder data based on the priority ranking and control the display device to provide the reminder data based on the priority ranking. The reminder data can include an option for at least one of declining a calendar event invitation and moving an event associated with the data.

The processing unit can be further enabled to control the display device to provide a calendar view of the data, wherein each of the events comprises a calendar event given a visual precedence in the calendar view based on the priority ranking. The processing unit can be further enabled to control each respective area according to different modes according to the priority ranking, at least one of the modes having a power lower than that of at least one other of the modes and the visual precedence can correspond to a higher power mode or a lower power mode.

The processing unit can be further enabled to generate delete data events based on the priority ranking to cause an event that meets a predetermined threshold value to be deleted from the data. The predetermined threshold value can be based on at least one of a period of time that a recurring calendar event has not been attended, a number of times that the recurring calendar event has been attended, and a threshold priority ranking The processing unit can be further enabled to generate a prompt indicative that the delete data events should be generated wherein the generate the delete data events occurs after receiving a positive response to the prompt.

The database can be stored in at least one of the memory device and a remote database.

At least one of the events can correspond to a work associated calendar event that occurs during a vacation period, the work associated calendar event automatically hidden during the vacation period. The processing unit can be further enabled to provide a show work appointments icon at the display device which, when selected, causes the work associated calendar event to be displayed, and provide a hide work appointments icon which, when selected, causes the work associated calendar events to be hidden.

At least one of the events can correspond to a travel-related calendar event that occurs during a travel period, the travel-related calendar event given a visual precedence during the travel period. At least another of the events can correspond to a non-travel-related calendar event that occurs during the travel period, the non-travel-related calendar event given diminished visual precedence during the travel period.

A third aspect of the specification provides a computer program product, comprising a computer usable medium having a computer readable program code adapted to be executed to implement a method for determining the priority of data in a database managed by a computing device, the data comprising a list of events, the computing device comprising a processing unit interconnected with a memory device and a display device. The method comprises processing context data at the processing unit to determine a priority ranking for each of the events in the list. Processing the context data to determine a priority ranking can comprises at least one of: processing the data to determine attendance data associated with each of the events; processing location data associated with each of the event to determine the attendance data; processing the attendance data associated with each of the events to determine if recurring events have been attended, and assigning higher respective priority rankings to events having higher attendance; processing the attendance data to determine which of at least two conflicting recurring events have been previously attended, and assigning higher respective priority rankings to an event having higher attendance; processing event data to determine when each of the events have occurred, been cancelled or moved; and processing telephone record data to determine the attendance data. The method further comprises controlling respective areas of the display device to provide visual representations of each of the events, each respective area controlled according to the priority ranking.

FIG. 1 depicts a system 100 including a computing device 101 for determining priority of data 102 in a database 103, for example, data 102 comprising items of data 102a, 102b, 102c . . . 102n, according to non-limiting implementations. Items of data 102a, 102b, 102c . . . 102n are referred to generically as an item of data 102, and collectively as data 102. While only four items of data 102 are shown in FIG. 1, it is appreciated that the number of items of data 102 is not particularly limiting and can be more or less than four. In depicted implementations, computing device 101 is enabled to communicate with database 103 via a link 104. However, it is appreciated that in further implementations, database 103 can be stored at computing device 101. Furthermore, computing device 101 is enabled to manage data 102 at database 103 to efficiently determine priority of data 102 in database 103 by processing context data 105, as will be described below.

It is appreciated that link 104 can comprise any suitable combination of wired and wireless links desired, such that computing device 101 can communicate with database 103. In some implementations, link 104 comprises a local link, such that mobile electronic device 102 can communicate with computing device 101 when local to computing device 101. In these implementations, local link 104 can include, but is not limited to a wired connection, a wireless connection, a cabled connection, a USB connection, a Wi-Fi connection, a Bluetooth connection, a near field communication (NFC) connection, and the like or a combination. Other suitable local connections are within the scope of present implementations.

However, in other implementations, link 104 can comprise any suitable communication network, such that computing device 101 can communicate with mobile electronic device 102 using any suitable over-the-air (OTA) protocol.

Computing device 101 comprises a processing unit 122 interconnected with a communication interface 124 and a memory device 127, for example via a computing bus (not depicted). Computing device 101 is further associated with an input device 126 and a display device 128 in communication with computing device 101, such that input data can be received at processing unit 122 from input device 126, and display device 128 can be controlled by processing unit 122. As depicted, input device 126 and display device 128 are internal to computing device 101, however in other implementations, input device 126 and display device 128 can be external to computing device 101.

Though not depicted, it is appreciated that database 103 is stored at any suitable computing device that includes a processing unit, a memory device and communication interface similar to processing unit 122, memory device 127 and communication interface 124. As described above, database 103 can be stored at computing device 101 and stored in memory device 127.

Computing device 101 can further comprises application 106 which, as described above, is appreciated to be a database management application. Application 106 can be stored in memory device 127 and processed by processing unit 122. Application 106 is described in further detail below.

In general, computing device 101 comprises any suitable computing device for processing application 106 and communicating with database 103, including but not limited to any suitable combination of personal computers, laptop computing devices, portable computing device, mobile electronic devices, PDAs (personal digital assistants), cellphones, smartphones and the like. Other suitable computing devices are within the scope of present implementations.

Processing unit 122 comprises any suitable processor, or combination of processors, including but not limited to a microprocessor, a central processing unit (CPU) and the like. Other suitable processing units are within the scope of present implementations.

Communication interface 124 comprises any suitable communication interface, or combination of communication interfaces, enabled to communicate with mobile electronic device 102 via link 104. Accordingly, communication interface 124 is enabled to communicate via link 104 according to any suitable protocol which is compatible with link 104, including but not limited to wired protocols, USB (universal serial bus) protocols, serial cable protocols, wireless protocols, cell-phone protocols, wireless data protocols, Bluetooth protocols, NFC (near field communication) protocols and/or a combination, or the like. In some implementations, communication interface 124 can be enabled to communicate with remote computing devices (e.g. servers, other computing devices, other mobile electronic devices, etc.), via any suitable communication network according to any suitable protocol, including but not limited to packet based protocols, Internet protocols, analog protocols, PSTN (public switched telephone network) protocols, Wi-Fi protocols, WiMAX protocols and the like, and/or a combination. Furthermore, communication interface 124 is enabled to communicate in a wireless or wired manner, as desired, compatible with link 104. Other suitable communication interfaces and/or protocols are within the scope of present implementations.

Input device 126 is generally enabled to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations.

Memory device 127 can comprise any suitable memory device, including but not limited to any suitable one of or combination of volatile memory, non-volatile memory, random access memory (RAM), read-only memory (ROM), hard drive, optical drive, flash memory, magnetic computer storage devices (e.g. hard disks, floppy disks, and magnetic tape), optical discs, and the like. Other suitable memory devices are within the scope of present implementations. In particular, memory device 127 is enabled to store application 106. In some implementations, memory device 127 can store database 103.

Display device 128 comprises circuitry 129 for generating representations of data, for example a representation 130 of application 106, as will be described below. Display device 128 can include any suitable one of or combination of CRT (cathode ray tube) and/or flat panel displays (e.g. LCD (liquid crystal display), plasma, OLED (organic light emitting diode), capacitive or resistive touchscreens, and the like). Circuitry 129 can include any suitable combination of circuitry for controlling the CRT and/or flat panel displays etc., including but not limited to display buffers, transistors, electron beam controllers, LCD cells, plasmas cells, phosphors etc. In particular, display device 128 and circuitry 129 can be controlled by processing unit 122 to generate representation 130.

In particular, attention is directed to FIG. 14 which depicts non-limiting implementations of display device 128 and circuitry 129, in communication with processing unit 122 and a memory cache 227 (hereinafter cache 227). In some implementations, memory device 127 can comprise cache 227, while in other implementations cache 227 can comprise a separate memory device. Furthermore, processing unit 122 is in communication with cache 227 and further enabled to control circuitry 129. In particular, processing unit 122 is enabled to control different areas 231a, 231b, 231c . . . 231n (generically an area 231 and collectively areas 231) of circuitry 129 according to different modes. For example, area 231a can be controlled according to a first mode, area 231b can be controlled according to a second mode, area 231c can be controlled according to a third mode, and area 231n can be controlled according to a fourth mode.

At least one mode of a respective area 231 can comprise a power level of circuitry 129 that is different from a power level of a mode of another area 231. For example, at least one of areas 231 can be controlled according to a mode that uses less power than at least one other mode. The power level can be determined base on priority of items of data 102 being displayed in areas 231, the priority of items in data 102 being determined from context data 105, as described below. Indeed, the mode of each area 231, and hence the associated power level, can be determined from the priority of each item of data 102 displayed in a corresponding area 231. As at least one area 231 is operating a lower power than other areas 231, the amount of power used in display device 128 is generally reduced. The difference in power levels between areas 231 also affects the visual appearance of each area 231 such that an item provided in a lower power level area 231 appears different from an item provided in a higher power level 231.

Though four areas 231 are depicted, it is appreciated that other implementations can comprise any suitable number of areas 231 that can be more or fewer than four. Furthermore, while areas 231 are arranged horizontally parallel to one another, with adjacent sides, the order and/or positioning of areas 231 in circuitry can be any suitable order and/or positioning and is not particularly limiting. As depicted, areas 231 can correspond to items in a list, for example a list of items of data 102, being displayed at display 128.

Figure 2:
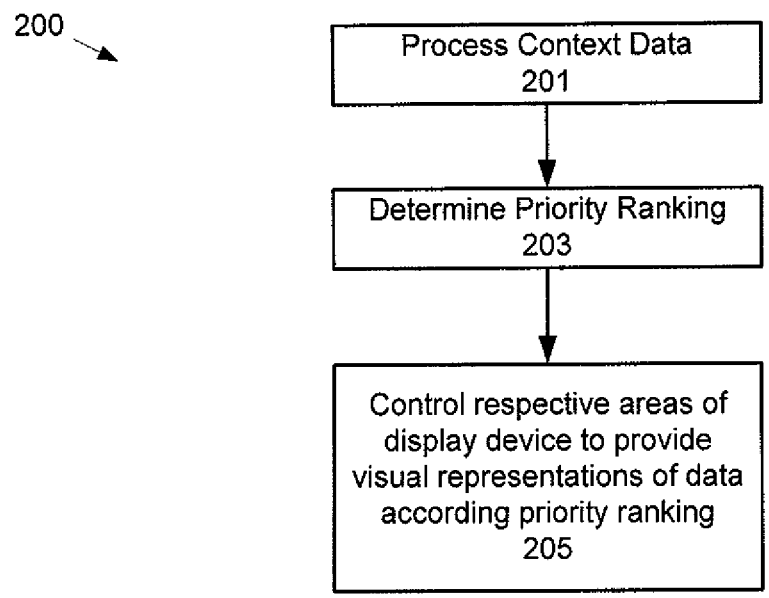
FIG. 2 depicts a flow chart of a method for determining priority of data in a database, according to non-limiting implementations.

In implementations depicted in FIG. 2, it is understood that circuitry 129 and areas 231 comprises, for example, transistors in flat panel display, however in other implementations, circuitry 129 can comprise a combination of an electron gun in a CRT, and areas 231 can comprise phosphors in a CRT. In particular, display 128 can comprise an organic light emitting diode (OLED) display, including but not limited to an active matrix OLED (AMOLED) or a passive matrix OLED (PMOLED), which have particular issues regarding power and aging. For example, OLED displays can age according to the amount of power dissipated in the OLED display and hence reducing power in the OLED display can extend the life of the display. Furthermore, OLED materials can age at different rates, with some OLED materials aging faster than other OLED materials. Hence, operating areas 231 according to modes which reduce power in at least a portion of display 128 according to the materials in the OLED display can increase the overall lifetime of display 128: for example, when a given area 231 is to be operated at a higher power than the other areas 231, the respective mode can be chosen to reduce the aging of the OLED materials in the given area 231 and/or to match the aging of the OLED materials in the other areas 231.

Turning now to data 102, each item of data 102 is associated with a given time period, and can include a given date, a start time, an end time and the like, such that data 102 is stored in database 102. For example, in some implementations, database 103 can comprise a calendar database and data 102 can comprise calendar events stored in database 103. While exemplary implementations will be described with reference to calendar events, it is appreciated that data 102 can be any suitable data which can be prioritized. For example, in further implementations, data 102 can comprises synchronization data that causes given folders, and the like, at computing device 101 to be synchronized, for example at different times. In yet further implementations, data 102 can comprise a task list. In yet other implementations, data 102 can comprise least cost routing data.

Context data 105 can comprise any suitable context data associated with data 102. For example, context data 105 can comprise time stamped location data such that it can be determined whether a calendar event associated with one or more items of data 102 has been attended. In implementations where computing device 101 is portable/mobile, location data can be determined using a location device 131 at computing device 101, as depicted such as a GPS (Global Positioning System) device, a triangulation device and the like. In further implementations, computing device 101 can be enabled to communicate with a portable location device (not depicted) to retrieve context data 105 for determining location at the time of a calendar event.

In yet further implementations, context data 105 can be determined by communicating with other computing devices local to computing device 101 to determine who else is in attendance at a calendar event. For example, as will be described in further detail below, when two or more calendar events conflict, computing device 101 can determine who else is in attendance at the calendar event that is attended, and compare the acquired attendee data with data 102. By comparing the attendee data with lists of invitees to the conflicting calendar events, in data 102, the one of the conflicting calendar events that was attended can be determined.

In yet further implementations context data 105 can be determined by comparing a location of computing device 101, via location device 131, and/or an associated user's location, with the location of one or more calendar events, for example, from each calendar event's location field. Hence, it can be determined that one of a plurality of conflicting events was attended when the location of computing device 101 and/or the location of an associated user coincides with the location of one of the calendar events while the calendar event was occurring. Similarly, it can be determined if a given calendar event was attended by comparing the location of computing device 101 and/or the location of an associated user with a location of the given calendar event while the given calendar event was occurring.

In other implementations, context data 105 can comprise attendance data (i.e. whether or not a calendar event was attended) that can be received via a calendaring application and/or stored in data 102. In other words, input data can be received via input device 126 indicating that the calendar event was attended. Alternatively, attendance data can be determined by processing calendar event acceptance data which can be stored in data 102, presuming that an indication of attendance to a calendar event being confirmed is in an indication of attendance.

In yet further implementations, context data 105 can be determined by processing message data, for example e-mails in an e-mail application, to determine if an event was attended.

In yet further implementations, context data 105 can be determined by processing telephone call logs to determine whether or not an event was attended remotely, e.g. via telephone. For example, by processing telephone call logs it can be determined if a conference call number for the calendar event was called just before (e.g. within a given time period) and/or during the calendar event.

In yet further implementations, context data 105 can be retrieved from a context server 140 via a suitable link 141 (which can be similar to link 104), context server 140 for determining a context of computing device 101 and/or a user associated with computing device 101. Context server 140 can comprise any suitable context server in communication with any suitable number of computing devices, sensors, location devices, and the like for determining a context of computing device 101 and/or a user associated with computing device 101. For example, context server 140 can be enabled to determine location, movement, an activity, and the like of computing device 101 and/or a user associated with computing device 101.

As will now be described, context data 105 is used to determine a priority ranking for each item of data 102.

Attention is now directed to FIG. 2 which depicts a method 200 for determining priority of data in a database managed by a computing device. In order to assist in the explanation of method 200, it will be assumed that method 200 is performed using system 100. Furthermore, the following discussion of method 200 will lead to a further understanding of system 100 and its various components. However, it is to be appreciated that system 100 and/or method 200 can be varied, and need not work exactly as discussed herein in conjunction with each other, and that such variations are within the scope of present implementations.

In exemplary implementations, method 200 is implemented at processing unit 122 in computing device 101. Furthermore, method 200 is implemented within application 106, hence it is appreciated that processing unit 122 is processing application 106.

At step 201, context data 105 is processed at processing unit 122 to determine a priority ranking for each item of data 102 at step 203. At step 205, respective areas 231 of display device 128 are controlled to provide visual representations of each of item in data 102, each respective area 231 controlled according to the priority ranking determined at step 203. In some embodiments, each respective area 231 can be controlled according to different modes based on the priority ranking, at least one of the modes having a power lower than that of at least one other of the modes.

For example, consider an implementation where data 102 comprises the contents of Table 1 as depicted in FIG. 18, Table 1 comprising a calendar view of data 102 when data 102 comprises calendar events.

While Table 1 is arranged in rows and columns, it is understood that data 102 can be in any suitable format. Table 1 generally represents a calendar for Monday, Feb. 1, 2010, with a column indicative of time of day, and a column indicative of calendar events occurring on Monday, Feb. 1, 2010. From Table 1, it understood that four calendar events are represented in Table 1, each corresponding to one of data 102a, 102b, 102c, 102n. For example, "Breakfast Meeting" corresponds to data 102a, "Weekly Department Meeting" corresponds to data 102b, "Monthly Sales Meeting" corresponds to data 102c, and "Weekly Squash Game" corresponds to data 102n. While only four calendar events are depicted in Table 1, it is understood that Table 1 can comprise any suitable number of calendar events occurring during any suitable time period.

Figure 4:
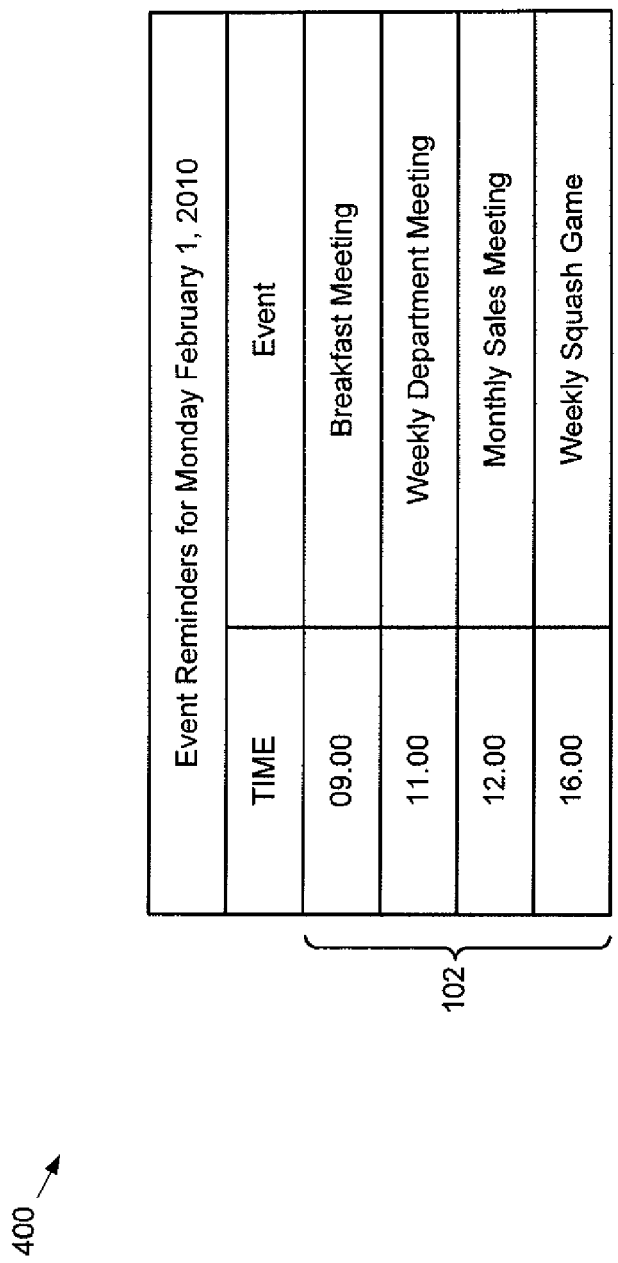
FIG. 4 depicts a representation of a list of event reminders, according to non-limiting implementations.

In any event, it is appreciated that items of data 102 can be provided in a representation 400 at display device 128, representation 400 depicted in FIG. 4 according to non-limiting embodiments. While representation 400 is arranged in rows and columns, data 102 can be arranged in any suitable format in representation 400. However representation 400 is generally inefficient as each of data 102 can have a different priority ranking as determined by method 200, which is not reflected in representation 400. Representation 400 can be provided at display device 128, for example as representation 130.

For example, a priority ranking for each item of data 102 can be determined by processing context data 105. It is further appreciated that context data 105 can exist for some items of data 102, but not other items of data 102. For example, "Breakfast Meeting" can be a one-time event, specific to the given time period, which does not repeat, but each of "Weekly Department Meeting", "Monthly Sales Meeting", and "Weekly Squash Game" can be recurring events, for which context data exits. For example, context data 105 can indicate that "Weekly Squash Game" is rarely attended based on past attendance data. Context data 105 can further indicate that "Monthly Sales Meeting" is always attended, and that the "Weekly Department Meeting" is always attended unless "Monthly Sales Meeting" conflicts, as in Table 1. Hence, a priority ranking can be assigned to each event. For example. "Monthly Sales Meeting" can be assigned a first order priority ranking, "Breakfast Meeting" can be assigned a second order priority ranking, "Weekly Department Meeting" can be assigned a third order priority ranking and "Weekly Squash Game" can be assigned a fourth order priority ranking, as schematically depicted in FIG. 3.

In implementations where one or more priority rankings conflict, the conflict can be resolved in any suitable manner: for example two items of data 102 having a similar attendance record can be ranked according to at least one of a start time, an end time, another invitee to the calendar event (for example, a calendar event to which the CEO (chief executive officer) is invited can be given a higher priority ranking than another meeting of initially similar priority ranking), a subject of the calendar event, or the like.

In implementations where context data 105 is associated with at least one item of data 102, the item of data 102 can be assigned a priority ranking in any suitable manner. For example, according to a start time, an end time, another invitee to the calendar event, a subject of the calendar event, or the like. In the example provided in Table 3, "Breakfast Meeting" is assigned a second order priority meeting as neither "Weekly Department Meeting" nor "Weekly Squash Game" are likely to be attended, but "Monthly Sales Meeting" is very likely to be attended.

Figure 3:
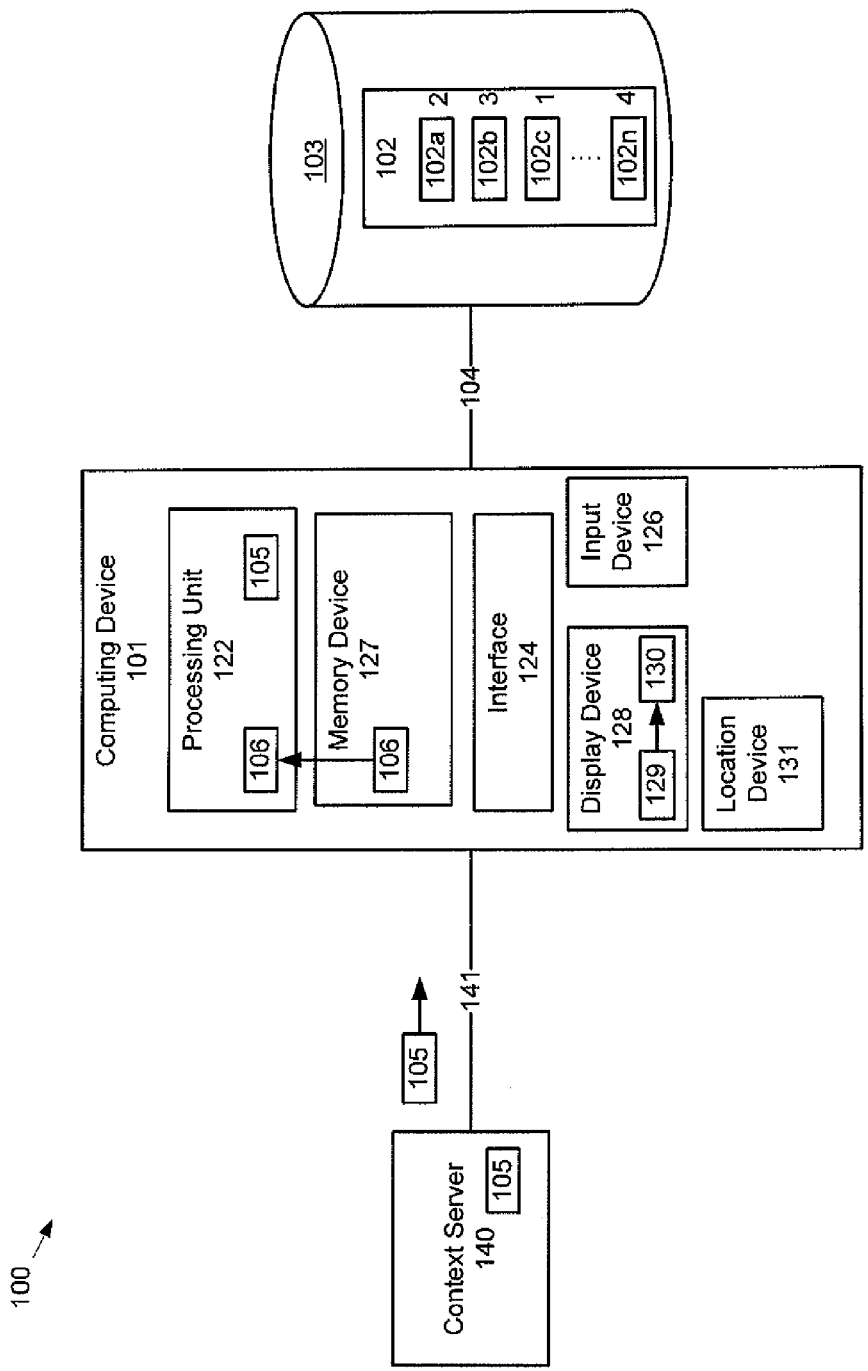
FIG. 3 depicts a block diagram of a system including a computing device for determining priority of data in a database, according to non-limiting implementations.

In some implementations, the priority ranking for each item of data 102 can be stored in database 103, as depicted in FIG. 3. In any event, representation 400 can be altered according to the priority ranking derived from context data 105 to a representation 500, as depicted in FIG. 5. Representation 500 is similar to representation 400, however text in representation 500 has been modified based on the priority ranking, as described above. Hence, the highest priority ranked event, "Monthly Sales Meeting" is depicted in a large, bold, underlined font, large being relative to the fonts of the other events, while the second highest ranked "Breakfast Meeting" is underlined, and the remaining events are depicted in smaller fonts. It is appreciated that the location of text "Breakfast Meeting", "Weekly Department Meeting", "Monthly Sales Meeting", and "Weekly Squash Game" correspond to areas 231a, 232b, 231c, 231n of circuitry 129 depicted in FIG. 14, and that areas 231 comprising the lower priority items, depicted in smaller fonts, will consume less power than that of the higher priority items at least by virtue of the smaller font size.

Alternatively, each area 231 corresponding to respective items of data 102 depicted in representation 500 can be controlled according to any suitable mode and include any suitable combination of bold fonts, italics, underlines, colours, shading, ghosting, icons, or the like, to indicate priority, with at least one mode being of lower power than the other modes.

However, in alternative embodiments, other attributes of each area 231, other than font of the text contained therein, can be controlled based on priority, including but not limited to colour, shading, brightness, etc., such that at least one mode of one area 231 is of a lower power than other areas 231.

In yet further embodiments, items of data 102 that fall below a given threshold priority ranking (e.g. such as "2"), can be absent from representation 500. For example, as depicted in FIG. 15, items of data 102 that are most likely not to be attended, are absent from a representation 1500.

Returning to FIG. 5, Representation 500 can be provided at display device 128, for example as representation 130. Representation 500 is further provided as reminders for each of the calendar events on Monday, Feb. 1, 2010, according to priority ranking. Hence, processing unit 122 causes reminder data derived from data 102 to be generated and controls display device 128 to provide the reminder data, in representation 500, based on the priority ranking.

In some implementations, steps 201 and 203 can comprise processing data 102 at processing unit 122 to determine attendance data associated with each item of data. For example, a record of attendance for recurring calendar events can be processed to determine a priority ranking, with recurring calendar events that are attended most frequently given a higher priority ranking than recurring calendar events attended less frequently. In other words, steps 201 and 203 can comprise processing the attendance data associated with each item of data 203 to determine if recurring calendar events have been attended, and assigning higher respective priority rankings to items of data 202 associated with having higher attendance.

Similarly, when at least two recurring calendar events conflict, steps 201 and 203 can comprise processing attendance data to determine which of the at least two conflicting recurring calendar events have been previously attended, and assigning higher respective priority rankings to items of data 102 associated with having the higher attendance.

In some implementations, steps 201 and 203 can comprise processing location data associated with each item of data 102 to determine the attendance data, as described above.

In some embodiments, the priority ranking can be assigned based on calendar events in a given period of time. For example, in Table 1, all the calendar events occur within a single day and the priority ranking is confined to calendar events within the single day. However, in other implementations, the priority ranking can be assigned to events in a given week, a given month, a given year or any other suitable time period. The given time period can be determined based on a time period that a calendar application is being controlled to provide. For example, a calendar application can be controlled to provide a calendar view of a single day (as in FIG. 6, described below), and hence priority rankings are confined to calendar events that occur within the single day, as in some implementations, assigning priority rankings for a longer time period can be a waste of resources, and further not be pertinent. For example, a calendar event having the highest priority occurs on a Friday, then calendar events on a Monday will be given a lower priority ranking and the highest priority event for that day may not be apparent.

In some implementations, data 102 can comprise only a single recurring calendar event. In these embodiments, the priority ranking for the single recurring event may be determined based on context data 105, and specifically on an attendance record for the single recurring calendar event. Hence, if the single recurring calendar event is never attended, this can be indicated in the priority ranking, for example by associating an indicator of low priority with the single recurring calendar event and/or its associated data 102: e.g. the indication can comprise text such as "low priority", "rarely attended", and the like; alternatively, a priority ranking of "0" can be associated with the calendar event.

Attention is now directed to FIG. 6 which depicts a representation 600 of a calendar view of data 102 when priority rankings have been determined, according to non-limiting implementations. Representation 600 can be provided at display device 128, for example as representation 130. Representation 600 is similar to Table 1, however representation 600 is provided as a calendar view of data 102, with data 102 given precedence in the calendar view based on the priority ranking. For example, an indication of the ranking of each calendar event is provided. Furthermore, a visual indication of the ranking of each calendar event is provided, such as suitable combination of bold fonts, italics, underlines, colours, shading, brightness, or the like, such that one area of circuitry 129 of display device 128, where representation 600 is being provided, is operated according to a mode having a lower power than other areas of circuitry 129. For example, the area of circuitry 129 that comprises "Weekly Squash Game" can be operated at a lower power than the area of circuitry 129 comprising "Monthly Sales Meeting", by virtue of a different font, colour, brightness, shading etc. Hence, processing unit 122 causes a calendar view data 102 to be generated and controls display device 128 to provide the calendar view, in representation 600, with each item of data 102 given precedence in the calendar view based on the priority ranking, with items of data 102 of relative lower priority being provided a lower power than items of data 102 having a relative higher priority.

Figure 7:
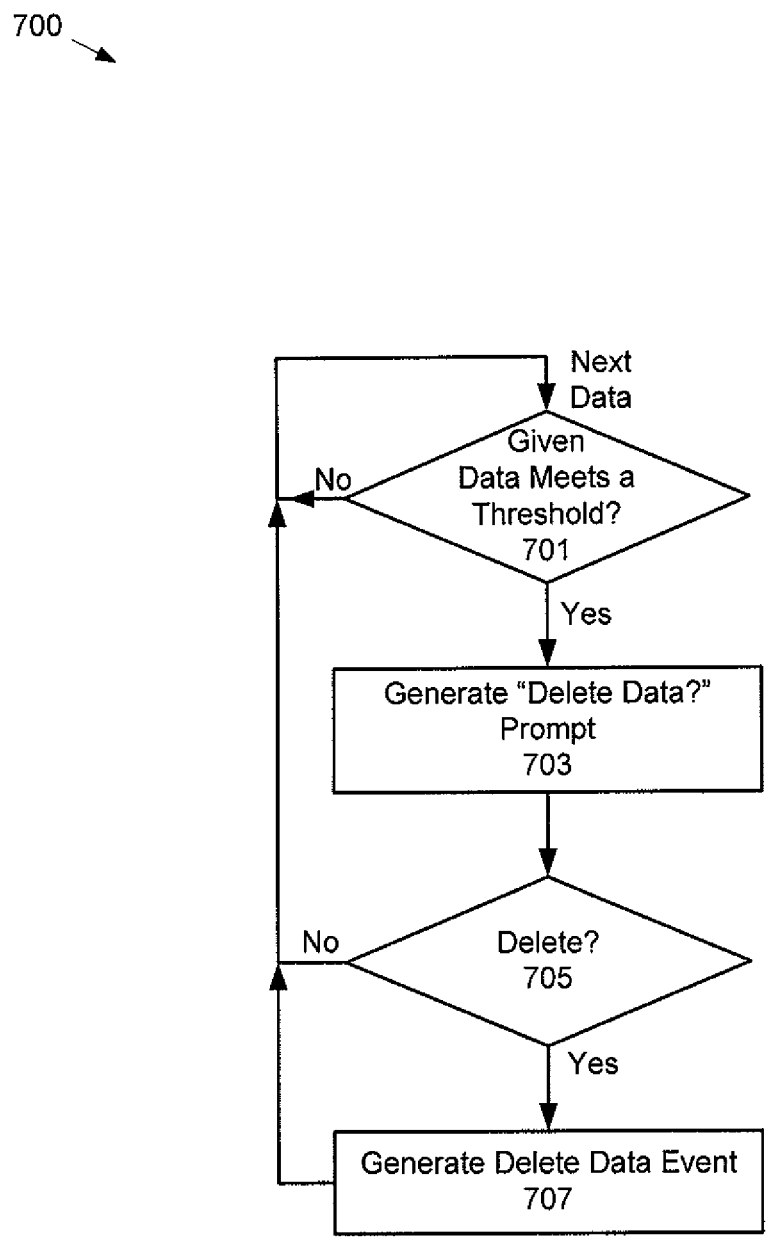
FIG. 7 depicts a flow chart of a method for deleting data based on a priority ranking, according to non-limiting implementations.

Attention is now directed to FIG. 7 which depicts a method 700 for deleting data 107 based on the priority ranking. In order to assist in the explanation of method 700, it will be assumed that method 700 is performed using system 100. Furthermore, the following discussion of method 700 will lead to a further understanding of system 100 and its various components. However, it is to be appreciated that system 100 and/or method 700 can be varied, and need not work exactly as discussed herein in conjunction with each other, and that such variations are within the scope of present implementations.

In method 700 it is appreciated that at least steps 201 and 203 have occurred such that a priority ranking has been assigned to data 102. Furthermore it is appreciated that method 700 is performed on each item of data 102, in any suitable order.

At step 701, it is determined whether a given item of data 102 meets a predetermined threshold. The predetermined threshold can be based on at least one of a period of time that a recurring calendar event has not been attended, and a number of times that the recurring calendar event has been attended, and threshold priority ranking. For example, the predetermined threshold can comprise a period of two months, or any other suitable time period, such that when a recurring calendar event has not been attended for at least two months, the predetermined threshold is met. Similarly, the predetermined threshold can comprise 1 time, such that when a recurring calendar event has only been attended once in a given time period, the predetermined threshold is met. In yet further implementations, the predetermined threshold can be value such as "4", such that calendar events given a priority ranking of 4 and/or above meet the predetermined threshold (assuming "1" is a high priority ranking and "4" is a low priority ranking). In general, the predetermined threshold identifies data 102 that has been assigned a low priority ranking and that can hence be cluttering database 103, using valuable memory and wasting computing resources at both computing device 101 and database 103 when processed.

In any event, when given data 102 does not meet the predetermined threshold, step 701 is repeated for a next item of data 102. However, given data 102 meets the predetermined threshold, at step 703 a "Delete Data?" prompt, or the like is generated. The prompt is indicative that a delete data event should be generated such that the given data 102 is deleted from database 103. A non-limiting implementation of such a prompt (prompt 801) is provided in FIG. 8, which is substantially similar to FIG. 6 with like elements having like numbers. In FIG. 8, it has been determined that "Weekly Squash Game" has not been attended in 2 months, as indicated in prompt 801. Prompt 801 further provides virtual buttons "Yes" and "No", which can be actuated via input device 126. When "No" is actuated, it is determined that data 102n, associated with the "Weekly Squash Game" is not to be deleted. However, when "Yes" is actuated, it is determined that data 102n associated with the "Weekly Squash Game" is to be deleted.

Figure 9:
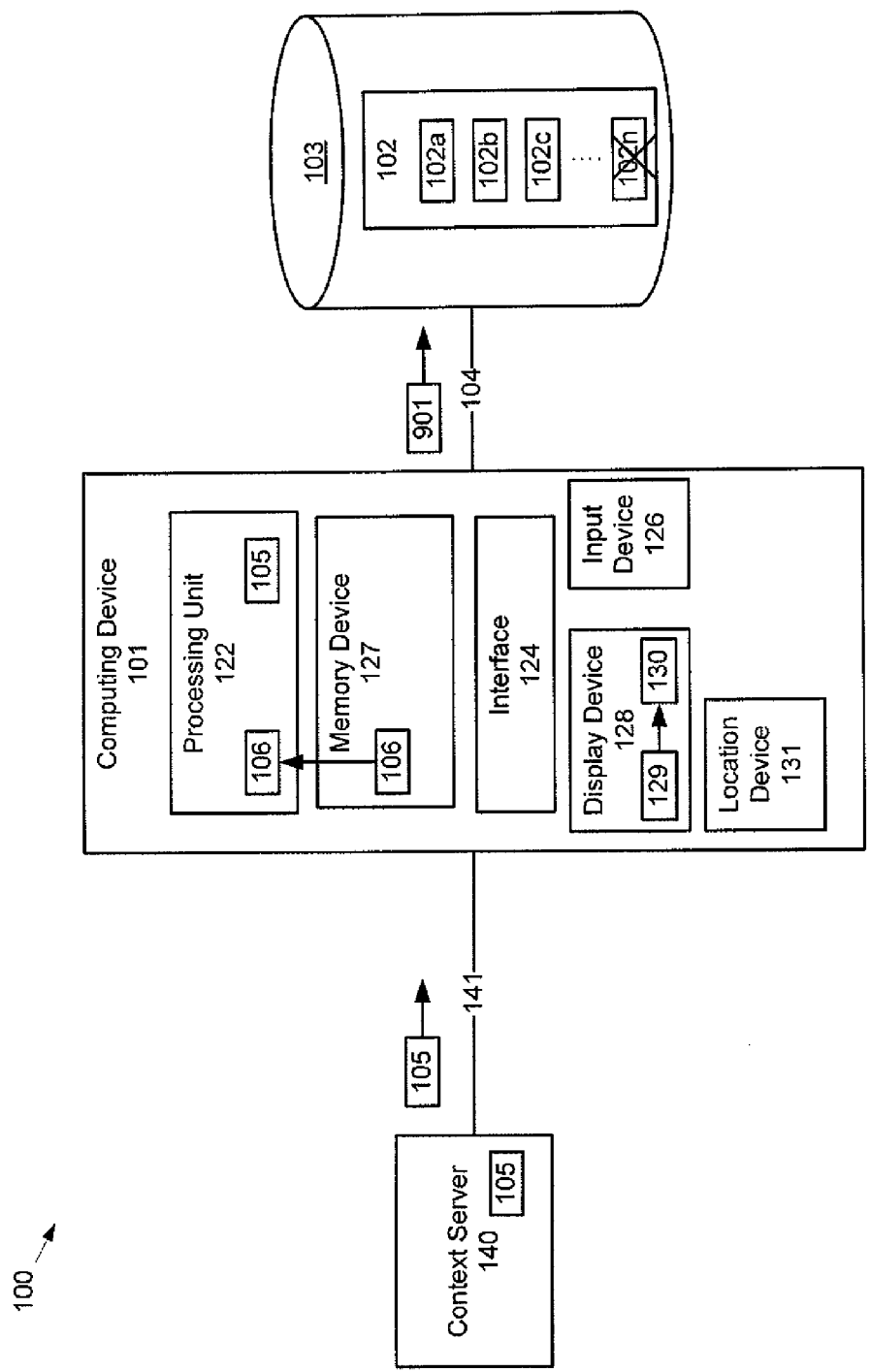
FIG. 9 depicts a block diagram of a system including a computing device for determining priority of data in a database with a delete data event generated, according to non-limiting implementations.

Returning to FIG. 7, when "Yes" is actuated at step 707, [[is implemented such that]] a delete data event is generated to cause the given data 102 that met the threshold at step 701 to be deleted. For example, as depicted in FIG. 9 (substantially similar to FIG. 1, with like elements having like numbers), a delete data command 901 is transmitted to database 103 via link 104 to cause data 102n (corresponding the "Weekly Squash Game") to be deleted, hence reducing clutter at database 103 and preventing data 102n from being processed unnecessarily as data 102 has essentially now expired. Furthermore, representation 600 can be updated as in FIG. 10 such that "Weekly Squash Game" is deleted from representation 600.

Again returning to FIG. 7, when "No" is actuated at step 705 or after the delete data event is generated at step 707, step 701 repeats for the next item of data 102. A prompt similar to prompt 801 can be generated for each item of data 102 that meets the predetermined threshold in step 701.

In alternative implementations, a prompt is not provided. Rather, data is deleted automatically when the threshold is met at step 701. In other words, steps 701 and 707 are implemented while steps 703 and 705 are not implemented. Whether or not to provide a prompt can be a user-selectable option at computing device 101.

In yet further implementations, an area 231 of display device 128 containing a low priority item of data 102 can be controlled to appear greyed (or according to any other suitable mode) with a virtual delete button within it or adjacent thereto. Such a delete button could appear in at least one of a calendar view and in a list items of data 102 that are most likely candidates for deletion, for example those items of data 102 that meet a given threshold priority (i.e. likely candidates for deletion would be provided with a delete button).

In general, the sequence in which data 102 is processed in method 700 can be any suitable sequence. In exemplary implementations, the sequence can be in reverse order of priority ranking, for example from lowest to highest as it is appreciated that items of data 102 with a lower priority ranking are more likely to be deleted. Furthermore, in some implementations, method 700 can be performed only on items of data 102 that are below a given priority ranking, as data 102 with a higher priority ranking is less likely to be deleted. Hence, for example, if there are 10 items of data 102, then method 700 can be performed for the bottom half of data 102, for example data 102 ranked at 5, 6, 7 . . . 10. Hence, method 700 is performed on data 102 that is most likely to be deleted.

In some embodiments, method 200 and/or method 700 can be modified to include generation of prompts to determine whether or not a calendar event is to be attended, based on the priority ranking. Furthermore, in some implementations, when a recurring calendar event has not been attended for a given period of time and/or not attended for a threshold number of times, then a meeting reminder can be automatically deactivated, though the calendar event is not necessarily deleted; the meeting reminder can be reactivated via an interaction with display device 128 and input device 126.

Figure 11:
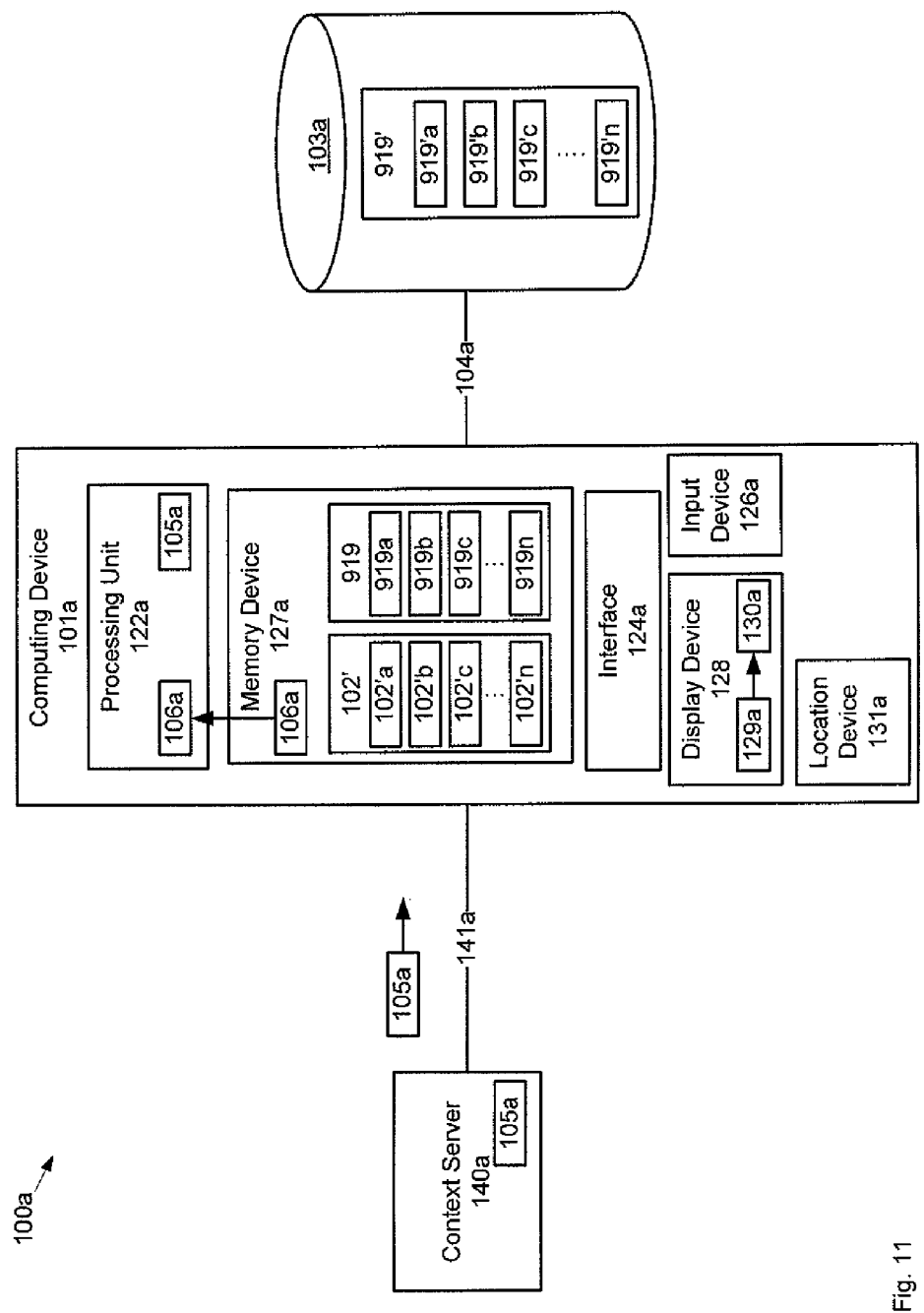
FIG. 11 depicts a block diagram of a system including a computing device for determining priority of data in a database, according to non-limiting implementations.

Attention is now directed to FIG. 11, similar to FIG. 1 with like elements having like numbers, however with an "a" appended thereto. For example computing device 101a is similar to computing device 101. However, for clarity, data 102' is similar to data 102. However, in these embodiments, data 102' is stored at memory device 127a, and each item of data 102' is respectively associated with data 919 comprising items of data 919a, 919b, 919c . . . 919n (collectively data 919, and generically data 919 and/or a item of data 919). Data 919 is in turn associated with data 919' comprising items of data 919'a, 919'b, 919'c, . . . 919'n (collectively data 919', and generically data 919' and/or a item of data 919') stored at database 103a, each item of data 919' corresponding to a respective item of data 919. It is appreciated that each item of data 919' comprises data that is to be synchronized with a respective item of data 919, and that each item of data 102' comprises respective synchronization data, including a schedule of when respective data 919' is to be synchronized. For example, each item of data 919 can comprise at least one of files, folders or the like that is to be synchronized with respective data 919'.

It is further appreciated that synchronizations can be cancelled as desired based on, for example, age of data 919, relevance of data 919, available bandwidth or the like. For example, consider when computing device 101a comprises a mobile electronic device and link 104a is at least in part wireless. If a synchronization event is to occur, according to data 102', at a time when computing device 101a is roaming and/or in an area where bandwidth is expensive or limited, such that the synchronization event will be costly and/or time consuming, then the synchronization event can be cancelled. In any event, context data 105a can be processed as described above to determine a priority ranking for each item of data 102' (each representative of a scheduled synchronization event), such respective areas of display device 128 can be controlled to provide visual representations of data 102 according to different modes based on the priority ranking, as described above using method 200. In these embodiments, the priority ranking can be based on whether previous synchronization events were cancelled and/or delayed.

Figure 14:
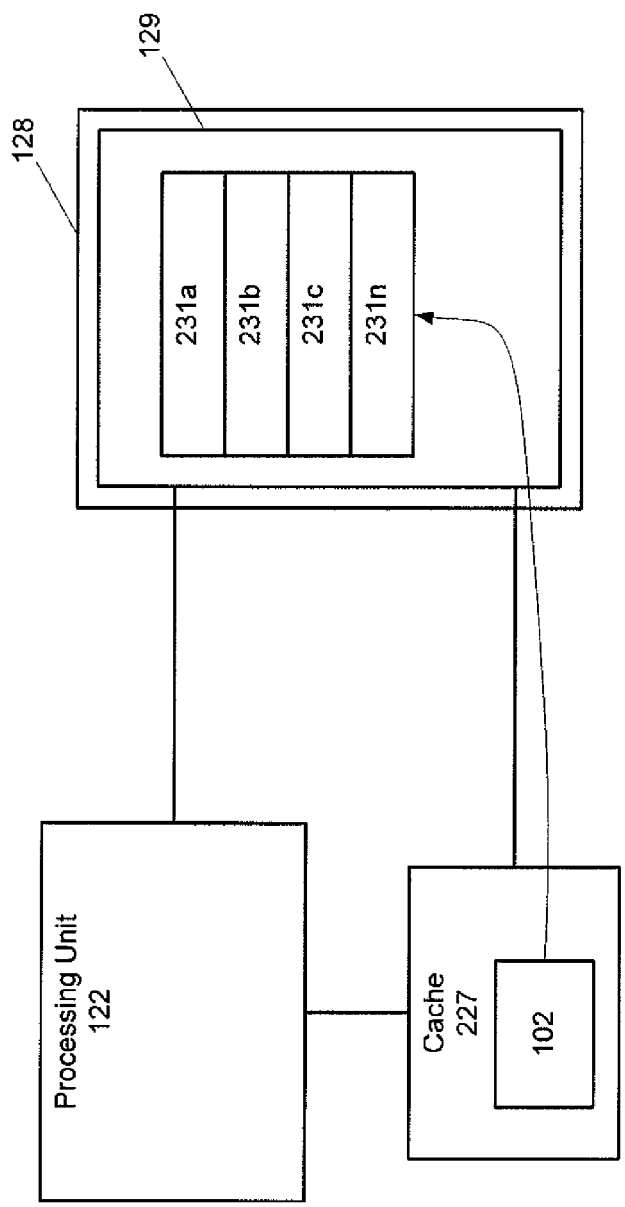
FIG. 14 depicts block diagram of details of the computing device of FIG. 1, according to non-limiting implementations.

For example data 919 can be presented in the form of a representation 1200 depicted in FIG. 12, similar to FIG. 5 however showing scheduled synchronization events in respective areas 231 (as depicted in FIG. 14) of display device 128 controlled to provide visual representations of each of item in data 919, each respective area 231 controlled according to different modes according to the priority ranking, similar to that of representation 500. At least one of the modes has a power lower than that of at least one other of the modes, as described above.

Figure 13:
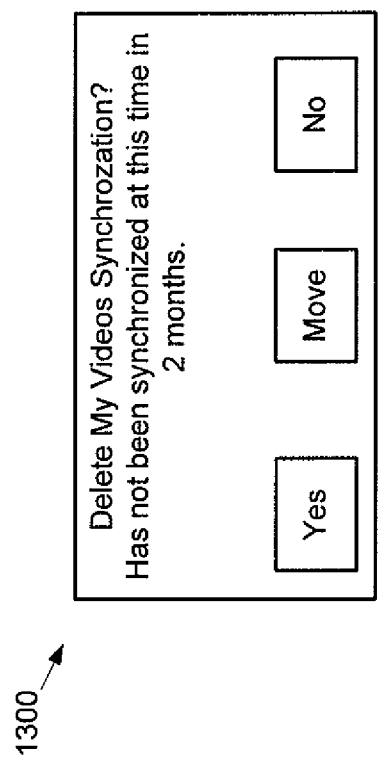
FIG. 13 depicts a representation of a prompt providing options for deleting or moving a synchronization event, according to non-limiting implementations.

Furthermore, method 700 can be implemented in computing device 101a to determine whether or not to delete given data 102', the predetermined threshold based on the priority ranking and/or the number of times the associated synchronization event was cancelled or moved. Furthermore, if the associated synchronization event was cancelled or moved, then an option of moving a time and/or date of a scheduled synchronization can be provided, for example as in a prompt 1300 depicted in FIG. 13, similar to prompt 801. However prompt 1300 includes a virtual "Move" button which, when actuated, provides options for moving the associated synchronization event to another date and/or time, and/or changing the schedule for synchronizing the associated data 919, for example at a date/time when bandwidth is more readily available and/or less costly.

Hence, present implementations can further cause bandwidth to be utilized more efficiently and/or more cheaply in addition to reducing power used in a display device/computing device.

In some implementations, as depicted in representation 1600 of FIG. 16, at least one of items of data 102 corresponds to a work associated calendar event that occurs during a vacation period. In the depicted implementations, work associated calendar event are automatically hidden during vacation periods, but non-work related events are provided, for example "Weekly Squash Game". FIG. 16 is similar to FIG. 6, however missing the work associated calendar events, "Breakfast Meeting", "Weekly Department Meeting", and "Monthly Sales Meeting". The determination of whether or not the given date is a vacation period or not can be determined from further data stored in database 103 and/or can be determined from a central database of employee vacation dates (not depicted).

Figure 17:
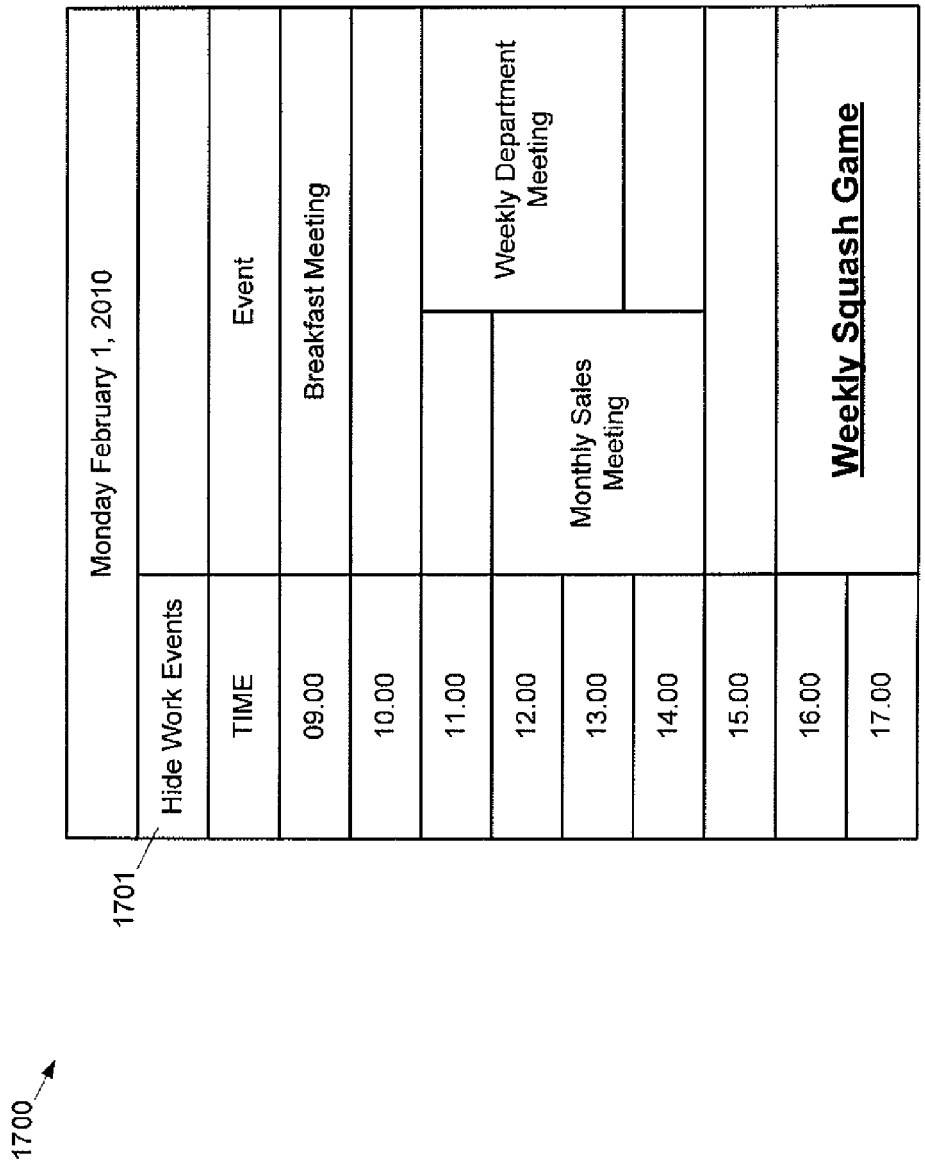

Representation 1600 further includes a show work appointments icon 1601 at display device 128 which, when selected, causes the work associated calendar event to be displayed in a representation 1700 depicted in FIG. 17, similar to FIG. 6. However, in FIG. 17, a hide work appointments icon 1701 is provided which, when selected, causes the work associated calendar events to be hidden, as in FIG. 16. In each of representations 1600 and 1700, events are provided in areas 231 of circuitry 129 that are controlled according to different modes based on the priority ranking. Indeed, the determination of an event being a work or vacation related event during a vacation period also serves as a priority ranking with, however, vacation events assigned a higher priority ranking then work events.

Again the power of the area 231 of circuitry 129 where a lower priority item of data 231 is displayed can consume less power than a higher priority item. For example, in each of FIGS. 16 and 18, display (or indeed lack thereof) of the work events consumes less power than the vacation events.

In yet further embodiments, at least one of data 102 can correspond to a travel-related calendar event that occurs during a travel period, In these embodiments, the visual precedence of data 102 displayed at display device 128, for example in a representation similar to representation 400, based on whether or not data 102 corresponds to the travel-related calendar event or a non-travel-related calendar event. For example, a travel related calendar event can be given a visual precedence during the travel period, and non-travel related calendar events can be given a diminished visual precedence. The visual precedence of the travel related calendar event and the non-travel related calendar events can be reversed if the travel does not occur, which can be determined, for example via location device 131. Furthermore, the power of areas 231 can be controlled based on whether or not visual precedence is to occur or is to be diminished, similar to that described above.

Those skilled in the art will appreciate that in some implementations, the functionality of computing device 101, 101*a* and database 103, 103*a* can be implemented using pre-programmed hardware or firmware elements (e.g., application specific integrated circuits (ASICs), electrically erasable programmable read-only memories (EEPROMs), etc.), or other related components. In other implementations, the functionality of computing device 101, 101*a* and database 103, 103*a* can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the implementations, and that the above implementations and examples are only illustrations of one or more implementations. The scope, therefore, is only to be limited by the claims appended hereto.

What is claimed is:

1. A method for determining priority of data in a database managed by a computing device, the data comprising a list of events, the computing device comprising a processing unit interconnected with a memory device and a display device, the method comprising:
   processing context data at the processing unit to determine an attendance history, and based on the attendance history a priority ranking for each of the events in the list;
   controlling respective areas of the display device to provide visual representations of each of the events in a calendar application, each respective area controlled according to the priority ranking;
   generating reminder data for at least two calendar events based on the priority ranking;
   controlling the display device to provide the reminder data for the at least two calendar events based on the priority ranking as determined based on the attendance history; and
   generating delete data events based on the priority ranking such that an event that meets a predetermined threshold value is deleted from the data.

2. The method of claim 1, wherein generating reminder data includes an option for at least one of declining a calendar event invitation and moving an event associated with the data.

3. The method of claim 1, further comprising controlling the display device to provide a calendar view of the data, wherein each of the events comprises a calendar event given a visual precedence in the calendar view based on the priority ranking.

4. The method of claim 1, wherein the predetermined threshold value is based on at least one of a period of time that a recurring calendar event has not been attended, a number of times that the recurring calendar event has been attended, and a threshold priority ranking.

5. The method of claim 4, further comprising generating a prompt indicative that the delete data events should be generated wherein the generating the delete data events occurs after receiving a positive response to the prompt.

6. The method of claim 1, wherein the database is stored in at least one of the memory device and a remote database.

7. The method of claim 1, wherein at least one of the events corresponds to a work associated calendar event that occurs during a vacation period, the work associated calendar event automatically hidden during the vacation period.

8. The method of claim 7, further comprising providing a show work appointments icon at the display device which, when selected, causes the work associated calendar event to be displayed, and providing a hide work appointments icon which, when selected, causes the work associated calendar events to be hidden.

9. The method of claim 1, wherein at least one of the events corresponds to a travel-related calendar event that occurs during a travel period, the travel-related calendar event given a visual precedence during the travel period.

10. The method of claim 9, wherein at least another of the events corresponds to a non-travel-related calendar event that occurs during the travel period, the non-travel-related calendar event given diminished visual precedence during the travel period.

11. The method of claim 1, wherein processing the context data to determine a priority ranking comprises at least one of:
processing the data to determine attendance data associated with each the event;
processing location data associated with each the event to determine the attendance data;
processing the attendance data associated with each the event to determine if recurring events have been attended, and assigning higher respective priority rankings to events having higher attendance;
processing the attendance data to determine which of at least two conflicting recurring events have been previously attended, and assigning higher respective priority rankings to an event having higher attendance;
processing event data to determine when each of the events have occurred, been cancelled or moved; and
processing telephone record data to determine the attendance data.

12. A computing device for determining priority of data in a database managed by the computing device, the data comprising a list of events, the computing device comprising:
a processing unit interconnected with a memory device and a display device, the processing unit enabled to:
process context data to determine an attendance history, and based on the attendance history a priority ranking for each of the events in the list;
control respective areas of the display device to provide visual representations of each of the events in a calendar application, each respective area controlled according to the priority ranking;
generate reminder data for at least two calendar events based on the priority ranking;
control the display device to provide the reminder data for the at least two calendar events based on the priority ranking as determined based on the attendance history; and
generate delete data events based on the priority ranking such that an event that meets a predetermined threshold value is deleted from the data.

13. The computing device of claim 12, wherein the reminder data includes an option for at least one of declining a calendar event invitation and moving an event associated with the data.

14. The computing device of claim 12, wherein the processing unit is further enabled to control the display device to provide a calendar view of the data, wherein each of the events comprises a calendar event given a visual precedence in the calendar view based on the priority ranking.

15. The computing device of claim 12, wherein the predetermined threshold value is based on at least one of a period of time that a recurring calendar event has not been attended, a number of times that the recurring calendar event has been attended, and a threshold priority ranking.

16. The computing device of claim 15, wherein the processing unit is further enabled to generate a prompt indicative that the delete data events should be generated wherein the delete data events occurs after receiving a positive response to the prompt.

17. The computing device of claim 12, wherein the database is stored in at least one of the memory device and a remote database.

18. The computing device of claim 12, wherein at least one of the events corresponds to a work associated calendar event that occurs during a vacation period, the work associated calendar event automatically hidden during the vacation period.

19. The computing device of claim 12, wherein the processing unit is further enabled to provide a show work appointments icon at the display device which, when selected, causes the work associated calendar event to be displayed, and provide a hide work appointments icon which, when selected, causes the work associated calendar events to be hidden.

20. The computing device of claim 12, wherein at least one of the events corresponds to a travel-related calendar event that occurs during a travel period, the travel-related calendar event given a visual precedence during the travel period.

21. The computing device of claim 20, wherein at least another of the events corresponds to a non-travel-related calendar event that occurs during the travel period, the non-travel-related calendar event given diminished visual precedence during the travel period.

22. The computing device of claim 17, wherein to process the context data to determine a priority ranking the processing unit is further enabled to at least one of:
process the data to determine attendance data associated with each the event;
process location data associated with each the event to determine the attendance data;
process the attendance data associated with each the event to determine if recurring events have been attended, and assign higher respective priority rankings to events having higher attendance;
process the attendance data to determine which of at least two conflicting recurring events have been previously attended, and assign higher respective priority rankings to an event having higher attendance;
process event data to determine when each of the events have occurred, been cancelled or moved; and
process telephone record data to determine the attendance data.

* * * * *